(12) United States Patent
Martucci

(10) Patent No.: US 8,807,174 B2
(45) Date of Patent: Aug. 19, 2014

(54) HOSE FOR FLUIDS PULSATING AT HIGH PRESSURE AND FREQUENCY AND METHOD OF CONSTRUCTION

(76) Inventor: Norman S. Martucci, Clarkston, MI (US)

( * ) Notice: Subject to any disclaimer, the term of this patent is extended or adjusted under 35 U.S.C. 154(b) by 0 days.

(21) Appl. No.: 13/638,149

(22) PCT Filed: Mar. 29, 2011

(86) PCT No.: PCT/US2011/030333
§ 371 (c)(1),
(2), (4) Date: Sep. 28, 2012

(87) PCT Pub. No.: WO2011/126840
PCT Pub. Date: Oct. 13, 2011

(65) Prior Publication Data
US 2013/0014850 A1    Jan. 17, 2013

Related U.S. Application Data

(60) Provisional application No. 61/318,837, filed on Mar. 30, 2010.

(51) Int. Cl.
*F16L 11/02* (2006.01)
*F16L 11/08* (2006.01)

(52) U.S. Cl.
CPC ............ *F16L 11/088* (2013.01); *F16L 11/087* (2013.01)
USPC ............ 138/129; 138/130; 138/144; 138/125

(58) Field of Classification Search
CPC ..... F16L 11/081; F16L 11/083; F16L 11/085; F16L 11/088; F16L 11/04; F16L 11/10
USPC ................ 138/130, 129, 144, 124–126, 137
See application file for complete search history.

(56) References Cited

U.S. PATENT DOCUMENTS

| 4,380,252 | A | * | 4/1983 | Gray et al. ................. | 138/125 |
| 5,613,524 | A | * | 3/1997 | Martucci .................... | 138/137 |
| 5,655,572 | A | * | 8/1997 | Marena ..................... | 138/125 |
| 6,039,084 | A | * | 3/2000 | Martucci et al. ............ | 138/137 |
| 6,302,150 | B1 | * | 10/2001 | Martucci et al. ............ | 138/125 |
| 6,889,716 | B2 | * | 5/2005 | Lundberg et al. ............ | 138/130 |
| 7,445,029 | B2 | * | 11/2008 | Kamiyama .................. | 138/127 |
| 2010/0032047 | A1 | * | 2/2010 | Mennig et al. ............... | 138/125 |

* cited by examiner

*Primary Examiner* — Patrick F Brinson
(74) *Attorney, Agent, or Firm* — Kohn & Associates PLLC

(57) ABSTRACT

A hose assembly resistant to internal high frequency high pressure fluid impulses including a tubular liner having an inner surface, an outer surface, and a wall therebetween defining a passageway, and at least one extrusion preventing layer operatively connected to said outer surface of said tubular liner. A method for making a hose assembly by extruding a flexible tubular liner, disposing an extrusion preventing layer by disposing an inner wrap of flattened fabric yarn with no interstices between adjacent windings onto an outer surface of the flexible tubular liner, and disposing an outer wrap helically counterwound about the inner wrap, securing the inner and outer wraps of the extrusion preventing layer to each other and to the tubular liner by applying a bond coating, and heating the assembly to dry, fuse, and cure the bond coating. A method of using the hose assembly.

31 Claims, 2 Drawing Sheets

HOSE FOR FLUIDS PULSATING AT HIGH PRESSURE AND FREQUENCY AND METHOD OF CONSTRUCTION

BACKGROUND OF THE INVENTION

1. Technical Field

The present invention relates to a hose assembly. More specifically, the present invention relates to a hose assembly for conducting fluid therethrough, preferably in automotive applications requiring resistance to rapid pressure impulses such as conducting liquids and gases such as fuels from diesel fuel injection pumps and the like. The invention also relates to a method of making a hose assembly.

2. Background Art

Hose assemblies suitable to carry fuel from computer-controlled diesel fuel injection pumps are known in the art. Like all automotive fuel hoses, they must be resistant to extreme temperatures and to a variety of fuel mixtures, fuel additives, and caustic chemicals, and must have sufficient hoop strength and burst resistance to withstand the outward pressure of the contained flow of fuel. Unique challenges, however, face hoses used in computer-controlled diesel injection systems. These systems produce pulses of fuel pressure that cycle from zero to 30,000 PSI at frequencies of 1-50 Hz or greater. The pulses tend to cause high speed cycles of expansion and contraction in hose diameter. These strong and rapid expansions and contractions have harmful consequences. They cause hoses to fail from physical fatigue. They compromise the efficiency of the injection system, because the fuel pressure fluctuates with each change in diameter. The pressure fluctuations burden the computer control system with a load of constant recalculations to maintain the desired fuel pressure patterns.

Polymeric fluorocarbon materials such as polytetrafluoroethylene possess the requisite chemical and temperature resistant properties for most fuel hose applications. Unfortunately, polymeric fluorocarbon materials are too low in tensile and hoop strength to withstand the demands of high frequency, high pressure fluid impulses. Hoses of polymeric fluorocarbons are also prone to kinking.

One solution to the problem is to permit pressure-induced fluctuations in hose diameter, as in the hose assembly disclosed in U.S. Pat. No. 4,611,633 to Buchholz et al., wherein a flexible inner liner expands and contracts within a rigid outer jacket. This type of hose, however, allows fluid pressure fluctuations that reduce the efficiency of computer control, as described above. Another solution is to construct hose assemblies of rigid materials sufficiently strong to contain fluid pressure pulses without bursting. For example, hoses can be constructed of metallic tubing or braid, for example the hardened steel tubing disclosed by U.S. Pat. No. 4,458,724 to Kubo, and braided stainless steel hoses such as Matchless Metal Hose 321 by Unaflex (Pompano Beach, Fla.). Metal hoses, though strong and resistant to many solvents, are too inflexible for use in cramped and irregular spaces. They also add weight to a vehicle, and usually require costly materials. Another solution known in the art is to construct hoses of a light flexible liner of thermoplastic or polymeric fluorocarbons, and enhance the liner's hoop strength, tensile strength, and kink resistance by surrounding its outer surface with reinforcing layers woven of metallic, plastic, or glass braid. Examples include the hose assemblies disclosed in U.S. Pat. No. 4,259,991 to Kutanyk, and U.S. Pat. No. 5,192,476 to Green. Such hoses can perform well under high constant pressures but have significant disadvantages when exposed to high frequency impulses of internal pressure. Metallic or glass braids inevitably incorporate interstices between rounded strands of metal or glass yarn. Rapid high pressure fluid impulses against the flexible inner liner walls cause those walls to undergo rapid cycles of balloon-like extrusion and withdrawal into and out of the interstices. This creates the probability of failure of the inner liner through fatigue. In addition, the rapid pressure impulses cause the fibers of the woven reinforcing braid layer to "saw" against each, weakening them and further increasing the probability of failure.

It is therefore desirable to have a hose assembly that has a light, flexible, chemical resistant polymeric fluorocarbon liner and which possesses high hoop and tensile strength, but does not necessarily rely on braided, woven material as the primary reinforcing layer.

SUMMARY OF INVENTION AND ADVANTAGES

According to the present invention, there is provided a hose assembly resistant to internal high frequency high pressure fluid impulses including a tubular liner having an inner surface, an outer surface, and a wall therebetween defining a passageway, and at least one extrusion preventing layer applied directly to the outer surface of the tubular liner.

The present invention also provides for a method for making a hose assembly by extruding a flexible inner liner, disposing an extrusion preventing layer by disposing an inner wrap of flattened fabric yarn with no interstices between adjacent windings onto an outer surface of the flexible tubular liner, and disposing an outer wrap helically counterwound about the inner wrap, securing the inner and outer wraps of the extrusion preventing layer to each other and to the tubular liner by applying a bond coating, and heating the assembly to dry, fuse, and cure the bond coating.

The present invention further provides for the present invention also provides for a method of using the hose assembly by flowing fluid through the tubular liner, when high frequency pressure impulses are exerted against the inner surface of the tubular liner, spreading and flattening fibers of the flattened fabric yarn of the inner wrap disposed about the tubular liner, preventing interstices of the inner wrap from opening, securing the inner wrap against the tubular liner with the outer wrap, and reducing fretting and wear from the fibers sawing against each other with the bond coating.

The present invention provides for a method of using a hose assembly by flowing fluid through the hose assembly, and preventing extrusions from forming on the hose assembly.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1A:
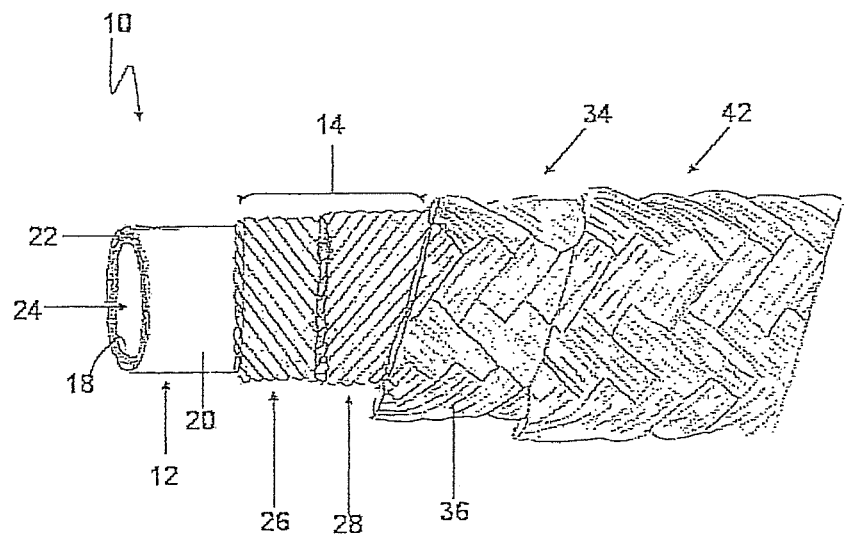
FIG. 1A is a partly cutaway perspective view of the present invention.

A hose assembly made in accordance with the present invention is generally shown at 10 in FIG. 1A, that prevents the formation of extrusions when a fluid flows therein. The assembly 10 includes a tubular liner 12 and an extrusion preventing layer 14 disposed about tubular liner 12.

Tubular liner 12 includes a paste extrudable, or less preferably, a melt extrudable polymeric fluorocarbon material resistant to both chemical and heat degradation. Tubular liner 12 is preferably extruded using well known paste or melt extrusion techniques and has a wall thickness between 0.001 and 0.120 inches. The walls of the tubular liner 12 define an inner surface 18, an outer surface 20, and a wall 22 therebetween defining a passageway 24. Although tubular liner 12 can be made of any number of polymeric fluorocarbon materials, it preferably includes a paste or melt extrudable fluorocarbon polymeric material including perfluorinated ethylene-propylene (FEP), copolymer of tetrafluoroethylene and hexafluoropropylene sold under the trademark TEFLON® FEP by DuPont, perfluoroalkoxy fluorocarbon resins (PFA), the copolymer of tetrafluoroethylene-perfluorovinyl ether sold under the trademark TEFLON® PFA by DuPont, or the copolymer of ethylene tetrafluoroethylene (ETFE) sold under the trademark TEFZEL by DuPont. In addition to the aforementioned polymeric fluorocarbon materials, any other paste or melt extrudable fluorocarbon polymeric materials known to those skilled in the art can be used.

Tubular liner 12 is preferably constructed of an extruded polymeric fluorocarbon because such liners have a smooth bore, free of convolutions and seams which can cause sufficient turbulence of fluid flow within passageway 24 of tubular liner 12 to cause cavitation and build-up of electrical charge within the hose assembly. This is undesirable in the situation when potentially flammable fluids are transported through hose assembly 10.

Preferably, tubular liner 12 further includes a conductive mechanism to dissipate dangerous static electric charges created by the flow of fluid. The conductive mechanism can include a longitudinal strip of carbon black (not shown) on the inner surface 18 of tubular liner 12, or alternatively, carbon black can be incorporated throughout tubular liner 12, making the entire tubular liner 12 a conductive mechanism. Both embodiments are disclosed in U.S. Pat. No. 6,302,150 to Martucci and Mathew. It will be appreciated that other conductive material can be used to form the conductive mechanism.

Although the preferred embodiment of hose assembly 10 includes a single, single walled tubular liner 12, it will be understood that a plurality of tubular liners concentrically disposed about each other, or a single tubular liner including a walls composed of a plurality of distinct layers, can alternatively be included.

At least one extrusion preventing layer 14 is disposed about tubular liner 12. Preferably there is one extrusion preventing layer 14. Extrusion preventing layer 14 includes an inner wrap 26 in direct contact with outer surface 20 of tubular liner 12, and an outer wrap 28 in direct contact with inner wrap 26.

Inner wrap 26 of extrusion preventing layer 14 is preferably constructed of a para-aramid, preferably KEVLAR® (DuPont). Para-aramids are preferred because of their high tensile strength and strength to weight ratio, great resistance to heat, chemicals, abrasion, and impact, and because they are much lighter in weight than materials of comparable properties such as all steel or all glass.

Inner wrap 26 is helically disposed about tubular liner 12, in direct contact with the outer surface 20 of tubular liner 12. Inner wrap 26 is helically disposed around tubular liner 20 with no interstices between adjacent windings, that is, with each lateral edge of each winding abutting against or preferably overlapping a lateral edge of each adjacent winding. In this manner 100% or greater braid coverage is provided over the outer surface of the tubular liner.

The flattened fabric yarn of inner wrap 26 is preferably disposed at a neutral angle with respect to the longitudinal axis of the tubular liner. An angle of approximately 50 degrees is well known to minimize movement and volumetric expansion of the hose under internal pressure, either longitudinally or across the diameter.

Figure 2A:
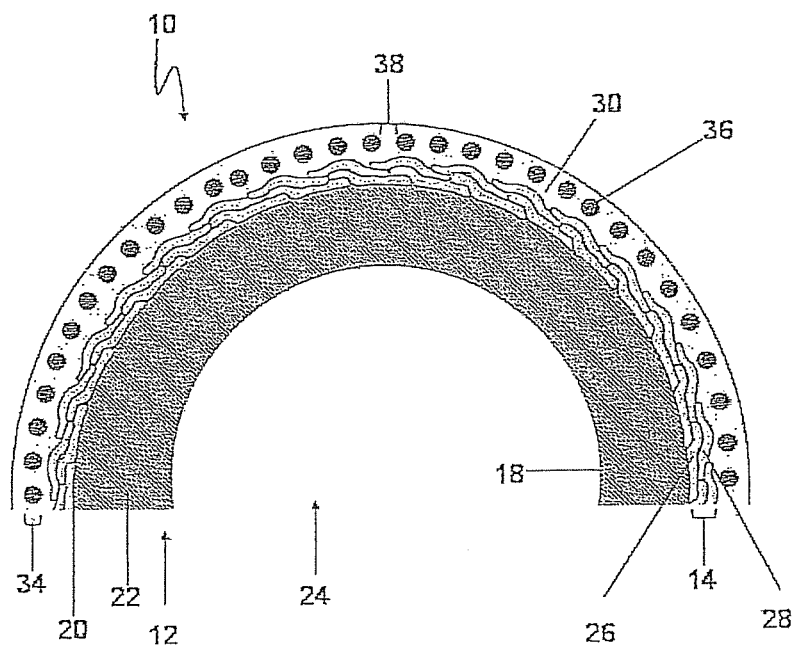
FIG. 2A is an enlarged sectional view of the present invention.
Figure 2B:
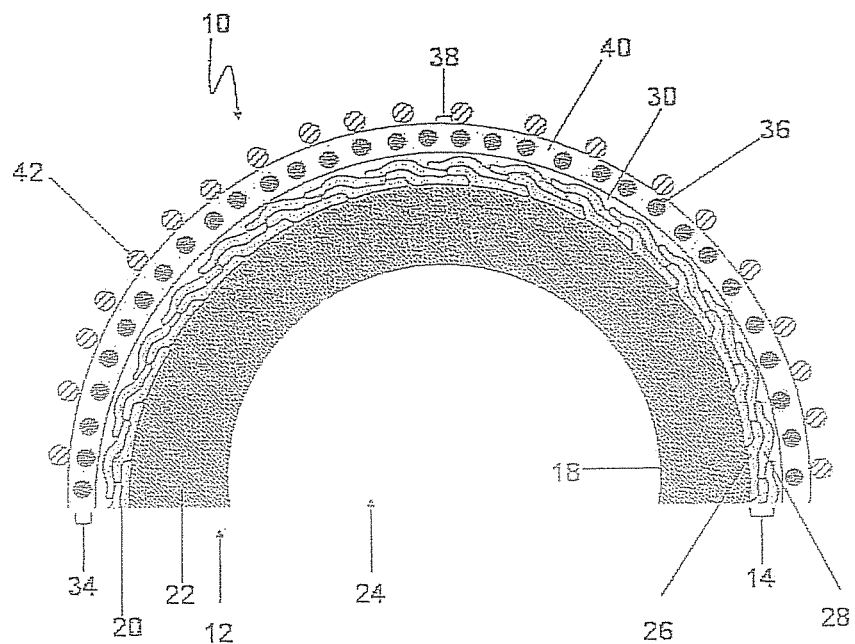
FIG. 2B is an enlarged sectional view of an alternative embodiment of the present invention.

Note that the yarn comprising inner wrap 26 is flattened in cross section as best shown in FIGS. 2A and 2B. Flattening occurs during application to the inner liner under tension. Yarns that are highly twisted, like braids and wire and plastic monofilaments, remain round in cross section after application, and therefore intrinsically allow interstices between windings, no matter how closely they are wound. Even if these interstices are minute, a flexible polymeric fluorocarbon tubular liner 12 would inevitably work its way though those interstices when placed under rapid impulses of great internal pressure. This would allow the walls of tubular liner 12 to undergo rapid cycles of bubble-like extrusion and withdrawal into and out of the interstices, creating fatigue and the risk of rupture. These cycles of extrusion and withdrawal also promote the failure of outer braided or woven reinforcing layers by causing the fibers of those layers to saw rapidly against each other.

In contrast, inner wrap 26 prevents balloon-like extrusions from forming because it includes windings of yarn that are flattened in cross section, with no interstices allowed between windings, and with overlaps between adjacent windings. In fact, internal pressure can cause tighter sealing against extrusions, because the fibers of the flattened fabric yarn of inner wrap 26 spread and flatten further against the surface to which they are applied. Preferably, then, the para-aramid yarn of inner wrap 26 is in the form of a yarn that is flattened in cross section.

Extrusion preventing layer 14 further includes at least one outer wrap 28 counter-wound about inner wrap 26, that is, helically disposed about inner wrap 26 in a direction opposite that of the helical windings of inner wrap 26, but at approximately the same neutral angle with respect to the longitudinal axis of hose assembly 10. Outer wrap 28 serves to secure inner wrap 26 of extrusion preventing layer 14 against tubular liner 12. This reinforces the interstice-sealing function of inner wrap 26, prevents inner wrap 26 from losing contact with outer surface 20 of tubular liner 12 or creeping across outer surface 20, and adds to hoop strength, tensile strength, and burst resistance. The neutral angle of the windings of outer wrap 28 also prevents the tubular liner from volumetric growth in any direction under internal pressure.

Preferably outer wrap 28 includes a structure similar to that of inner wrap 26, that is, of flattened fabric yarn of a para-aramid such as KEVLAR® helically disposed around, and in direct contact with, inner wrap 26 so that no interstices are left between adjacent helical windings, i.e. 100% braid coverage is provided over inner wrap 26. Outer wrap 28 is preferably disposed at a neutral angle with respect to the longitudinal axis of the tubular liner but in a direction opposite that of the helical windings of inner wrap 26.

Alternatively, outer wrap 28 can include any structure that binds inner wrap 26 to outer surface 20 of tubular liner 12, prevents inner wrap 26 from creeping, enhances the resistance of hose assembly 10 to elongation under pressure, and preserves the flexibility and kink resistance of hose assembly 10. This broad latitude of structure of outer wrap 28 is permissible because outer wrap 28 does not play a direct role in preventing extrusion of tubular liner 12 under impulses of high pressure, but rather supports the extrusion preventing action of inner wrap 26.

Figure 1B:
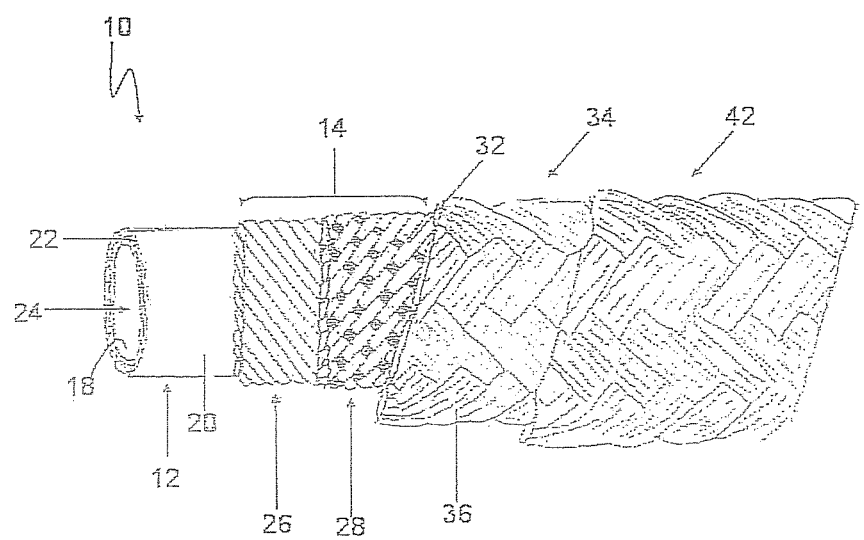
FIG. 1B is a partly cutaway perspective view of an alternative embodiment of the present invention.

In a preferred alternative embodiment of hose assembly 10, outer wrap 28 includes a braided and woven material of interlocking fibers 32 with interstices therebetween, as shown in FIG. 1B and FIG. 2B. The interlocking fibers are preferably composed of a para-aramid such as KEVLAR® but can be of any suitable metallic or nonmetallic material known in the art. A preferred alternative is a glass fiber such as fiberglass. Interlocking fibers 32 are preferably woven at a neutral braid angle with respect to the longitudinal axis of the tubular liner but in a direction opposite that of the helical windings of inner wrap 26. In a preferred embodiment, the interlocking fibers 32 are tightly woven such that the interstices and spaces between the adjacent fibers are minimized.

In the preferred embodiment, inner wrap 26 and outer wrap 28 are secured to each other and to tubular liner 12 by a bond coating 30, an organic polymeric material that is dispersed among the fibers of the inner and outer wraps. Bond coating 30 preferably includes an organic polymer, specifically, the polymer of tetrafluoroethylene (PTFE), the polymer of fluorinated ethylene propylene (FEP), the polymer of perfluoroalkoxy resin (PFA), or the polymer of ethylene-tetrafluoroethylene (ETFE).

Hose assembly 10 can additionally include at least one reinforcing layer 34 disposed about outer wrap 28 of extrusion preventing layer 14. This embodiment is preferred if greater hoop strength, tensile strength, and resistance to bursting and kinking desired. Reinforcing layer 34 includes braided and woven reinforcing material 36 disposed in an interleaving fashion about outer wrap 28 of extrusion preventing layer 14. Preferably, reinforcing layer 34 includes a braided, woven para-aramid such as KEVLAR® but it can also include fiberglass, metallic wire, or combinations including various combinations of fabric, glass, and/or wire. Preferably, braided and woven reinforcing material 36 is constructed with interstices 38 between adjacent fibers. Reinforcing layer 34 preferably incorporates bond coating 30 which in this embodiment is dispersed through reinforcing layer 34 as well as outer wrap 28 and inner wrap 26 of extrusion preventing layer 14. Bond coating thereby secures reinforcing layer 34 to extrusion preventing layer 14.

Alternatively, reinforcing layer 34 can be secured to extrusion preventing layer 14 by means of a coating separate and of a different composition than bond coating 30. This reinforcement coat 40, as shown in FIG. 2B, preferably includes an organic polymeric material. The polymer can be foamed, i.e. composed of a closed cell fluorocarbon polymer foam as disclosed in U.S. Pat. No. 5,613,524 to Martucci. A foamed bonding coating 40 has the advantage of decreasing weight and use of materials.

Hose assembly 10 can additionally or alternatively include at least one metallic braid layer 42. This embodiment is preferred if pressures are sufficiently high, and the environment is sufficiently harsh, to warrant some reduction in lightness, thinness, and flexibility in exchange for greater hoop strength, tensile strength, and resistance to bursting, kinking, and abrasion. A metallic braid layer 42 also provides for a more positive affixation of couplings and end fittings (not shown). Metallic braid layer 42 can be substituted for reinforcing layer 34, but preferably it is included in addition to reinforcing layer 34. In that case, metallic braid layer 42 is preferably disposed exterior to reinforcing layer 34, that is, in a direction away from passageway 24. Metallic braid layer 42 can include any suitable metal material. In the preferred embodiment of hose assembly 10, metallic braid layer 42 is made from stainless steel wire.

Hose assembly 10 can further include coupling means (not shown) such as the quick coupling device disclosed in U.S. Pat. No. 5,931,510 to Martucci and Mathew, so that the assembly can be connected to an external device.

The preferred method for making hose assembly 10 is as follows. Tubular liner 12, including an organic polymer is extruded as disclosed in U.S. Pat. No. 6,302,150 to Martucci and Mathew. Preferably tubular liner 12 has a wall thickness of between 0.001 and 0.120 inches and is made of the polymer of tetrafluoroethylene (PTFE), the polymer of fluorinated ethylene propylene (FEP), the polymer of perfluoroalkoxy resin (PFA), or the polymer of ethelyne-tetrafluoroethylene (ETFE). The fluorocarbon polymers PTFE, FEP, and PFA are sold under the trademark TEFLON by Dupont. The polymer ETFE is sold under the trademark TEFZEL by Dupont.

Inner wrap 26 of extrusion preventing layer 14 is constructed by using a braiding machine well known in the art to apply fabric yarn, which flattens upon application under tension, directly onto outer surface 20 of tubular liner 12. The yarn is preferably KEVLAR® yarn twisted sufficiently to impede elongation under pressure, at approximately 1-6 turns per inch and preferably twisted at 1.5 turns per inch.

Preferably the braiding machine includes at least one spool which carries a pre-twisted yarn although alternatively suitable fibers can be twisted into yarn during the application process. Preferably the yarn is disposed so that no interstices occur between adjacent helical windings and so that overlaps do occur between adjacent windings, i.e. 100% or better braid coverage is provided over the outer surface of the tubular liner. The flattened fabric yarn is preferably disposed at a neutral braid angle with respect to the longitudinal axis of the tubular liner, most preferably an angle of approximately 50 degrees.

Outer wrap 28 of extrusion preventing layer 14 is next disposed about inner wrap 26. Preferably, outer wrap 28 includes the same flattened para-aramid yarn as that preferred for inner wrap 26. It applied by the same method described for inner wrap 26, above, so that neither interstices nor overlaps are allowed between adjacent helical windings, but it is applied at a braid angle opposite to that of the windings of inner wrap 26.

Alternatively outer wrap 28 includes a braided and woven material of interlocking fibers 32 with interstices therebetween. In this embodiment, outer wrap 28 can be of any suitable nonmetallic material known in the art. A braided outer wrap 28 is preferably applied by a braiding machine equipped with a plurality of spools which carry the fiber material. The fibers are fed through the machine to a braiding area to be wound about inner wrap 26. Alternatively, a braided outer wrap 28 can be constructed in a pre-made, sock-like fashion and applied about the exterior of the inner wrap 26.

The assembly of tubular liner 12, inner wrap 26 and outer wrap 28 can next be bonded together by bond coating 30. This enhances the strength and burst resisting properties of extrusion preventing layer 14 as well as its ability to prevent growth in any direction under internal pressure. Bond coating 30 also provides a lubrous coating that reduces the fretting and wear of the fibers of inner wrap 26 and outer wrap 28 as these fibers saw against each other under high frequency pressure impulses. Preferably, an emulsion of fluorocarbon material in a carrying fluid is applied by dipping, that is, by passing the assembly through a reservoir containing the fluorocarbon emulsion. Alternatively, the assembly is sprayed with the fluorocarbon emulsion. Preferably, the emulsion includes between about 10% to 90% solid fluorocarbon polymer material as particles. The preferred carrying agent is water, but other suitable carrying agents can be used.

Hose assembly 10 is then subjected to successive heating steps to dry, fuse, and cure the fluorocarbon polymer material. This is preferably accomplished by first sending hose assembly 10 to a dryer, a preheat oven which keeps the emulsion preferably below the boiling temperature of the carrying agent to avoid the generation of gas bubbles, so that the carrying agent is removed to leave a coating of polymeric fluorocarbon material. As hose assembly 10 reaches a temperature of approximately 500 degrees, impurities are removed from the fluorocarbon material. Hose assembly 10 is then sintered at a suitable temperature (roughly 700° F.). This results in a cured bond coating layer 30. Preferably, the drying, baking, and sintering steps are performed in successive regions of a single oven so that the curing process is carried out in continuous fashion.

If reinforcing layer 34 is desired, it can be disposed about outer wrap 28 of extrusion preventing layer 14 prior to the application and curing of coating layer 30 so that tubular liner 12, extrusion preventing layer 14, and reinforcing layer 34 are bonded together as a unit, in a single operation. Braided and woven reinforcing material 36 is applied with a braiding machine generally similar to that described for the application of outer wrap 28, above.

Preferably, the braided and woven reinforcing material 36 includes braided, woven KEVLAR® but it can also consist of fiberglass, metallic wire, or combinations including various combinations of fabric, glass, and/or wire.

Alternatively, reinforcing layer 34 can be constructed in a separate step, after the application and curing of bond coating 30. Braided and woven reinforcing material 36 is applied with a braiding machine as described above and coated with reinforcing coating 40. This coating is preferably a fluorocarbon emulsion but can differ in composition from bonding coating 30. If the chosen material permits, reinforcing coating 40 is applied, dried, and cured by the dipping, drying, baking, and sintering method described for bond coating 30, above. An advantage of constructing reinforcing layer 34 in a step separate from construction of outer wrap 28 is that it permits the use of a coating different in composition from that of bonding coating 30

If it is desired that hose assembly 10 further include metallic braid layer 42, this layer is preferably disposed exterior to reinforcing layer 34. Construction of metallic braid layer 42 can be performed as disclosed in U.S. Pat. No. 6,302,150 to Martucci and Mathew. Briefly, metallic braid layer 42 is preferably made from stainless steel and is preferably braided in place by a braiding machine of a type well known in the art. The machine draws stainless steel wire from a plurality of spools and delivers it to a braiding area where the wires are braided or wound about the exterior of reinforcing layer 34. Alternatively, metallic braid layer 42 can be constructed in its entirety in a sock-like fashion and then applied about the exterior of reinforcing layer 34. Metallic braid layer 42 need not be bonded to underlying hose assembly 10.

There are several advantages to using the hose assembly 10 of the present invention. In operation, when high frequency pressure impulses are exerted against the inner surface of the tubular liner, the tubular liner cannot balloon through the extrusion preventing layer because the fibers of the flattened fabric yarn of the inner wrap spread and flatten further against the surface to which they are applied, thereby preventing interstices from opening; and because the outer wrap secures the inner wrap of the extrusion preventing layer against the tubular liner. The bond coating adds to burst resistance and also provides a lubrous coating to the fibers of the inner and outer wraps, reducing the fretting and wear that can be produced when pressure impulses cause fibers to saw against each other. In addition, the outer wrap ensures that the extrusion preventing layer functions properly in areas where the hose assembly is bent. Bending tends to open up interstices between the windings of the inner wrap; the outer wrap prevents those interstices from opening.

Therefore, the present invention also provides for a method of using the hose assembly by flowing fluid through the tubular liner, when high frequency pressure impulses are exerted against the inner surface of the tubular liner, spreading and flattening fibers of the flattened fabric yarn of the inner wrap disposed about the tubular liner, preventing interstices of the inner wrap from opening, securing the inner wrap against the tubular liner with the outer wrap, and reducing fretting and wear from the fibers sawing against each other with the bond coating.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

Obviously, many modifications and variations of the present invention are possible in light of the above teachings. It is, therefore, to be understood that within the scope of the appended claims wherein reference numerals are merely for convenience and are not to be in any way limiting, the invention can be practiced otherwise than as specifically described.

REFERENCES

U.S. Pat. Nos.

U.S. Pat. No. 4,259,991
U.S. Pat. No. 4,458,724
U.S. Pat. No. 4,611,633
U.S. Pat. No. 5,192,476
U.S. Pat. No. 5,613,524
U.S. Pat. No. 5,931,510
U.S. Pat. No. 6,302,150

What is claimed is:

1. A hose assembly resistant to internal high frequency high pressure fluid impulses comprising: a tubular liner having an inner surface, an outer surface, and a wall therebetween defining a passageway; and at least one extrusion-preventing layer operatively connected to said outer surface of said tubular liner, wherein said extrusion-preventing layer includes at least one inner wrap comprising a flattened fabric yarn helically disposed around said tubular liner and in direct contact with said outer surface of said tubular liner, wherein said flattened fabric yarn is flattened in cross-section, and wherein said flattened fabric yarn is twisted to impede elongation under pressure, at 1-6 turns per inch.

2. The hose assembly of claim 1, wherein said tubular liner is made from a paste or melt extrudable fluorocarbon polymeric material.

3. The hose assembly of claim 2, wherein said fluorocarbon polymeric material is chosen from the group consisting of perfluorinated ethylene-propylene (FEP), perfluoroalkoxy fluorocarbon resins (PFA), and the copolymer of ethylene tetrafluoroethylene (ETFE).

4. The hose assembly of claim 1, wherein said tubular liner has a thickness of between 0.001 and 0.120 inches.

5. The hose assembly of claim 1, wherein said tubular liner further includes conductive means for dissipating static electric charges created by the flow of fluid.

6. The hose assembly of claim 5, wherein said conductive means are chosen from the group consisting of a longitudinal strip of carbon black, and carbon black incorporated throughout said tubular liner.

7. The hose assembly of claim 1, further including at least one additional tubular liner concentrically disposed about said tubular liner.

8. The hose assembly of claim 1, wherein said flattened fabric yarn is a para-aramid.

9. The hose assembly of claim 1, wherein said flattened fabric yarn is twisted at 1.5 turns per inch.

10. The hose assembly of claim 1, wherein said flattened fabric yarn is helically disposed about said tubular liner without interstices between adjacent helical windings.

11. The hose assembly of claim 10, wherein said flattened fabric yarn is disposed about said tubular liner with overlaps between helical windings.

12. The hose assembly of claim 1, wherein said flattened fabric yarn is disposed at a neutral angle with respect to a longitudinal axis of said tubular liner.

13. The hose assembly of claim 12, wherein said neutral angle is approximately 50 degrees.

14. The hose assembly of claim 1, wherein said extrusion-preventing layer further includes at least one outer wrap counter-wound about said inner wrap to secure said inner wrap against said outer surface of said tubular liner.

15. The hose assembly of claim 14, wherein said outer wrap includes flattened fabric yarn disposed so that no interstices are left between adjacent helical windings.

16. The hose assembly of claim 15, wherein said flattened fabric yarn is a para-aramid.

17. The hose assembly of claim 14, wherein said outer wrap includes a nonmetallic braid or weave.

18. The hose assembly of claim 17, wherein said nonmetallic braid or weave is fiberglass.

19. The hose assembly of claim 14, wherein said inner and outer wraps are secured to each other and to said tubular liner by a bond coating.

20. The hose assembly of claim 19, wherein said bond coating is a layer of organic polymeric material.

21. The hose assembly of claim 20, wherein said organic polymeric material is a fluorocarbon that is dispersed among the fibers of said inner and outer wraps.

22. The hose assembly of claim 20, wherein said bond coating is chosen from the group consisting of the polymer of tetrafluoroethylene (PTFE), the polymer of fluorinated ethylene propylene (FEP), the polymer of perfluoroalkoxy resin (PFA), or the polymer of ethylene-tetrafluoroethylene (ETFE).

23. The hose assembly of claim 14, wherein said outer wrap is disposed at a neutral angle with respect to the longitudinal axis of said tubular liner and in a direction opposite to said inner wrap.

24. The hose assembly of claim 14, further including at least one reinforcing layer about said outer wrap.

25. The hose assembly of claim 24, wherein said reinforcing layer includes braided and woven material chosen from the group consisting of a para-aramid, fiberglass, metallic wire, and combinations thereof.

26. The hose assembly of claim 24, wherein said reinforcing layer includes interstices between adjacent fibers.

27. The hose assembly of claim 24, wherein said reinforcing layer and said extrusion preventing layer are secured to each other by a bond coating.

28. The hose assembly of claim 24, wherein said reinforcing layer and said extrusion preventing layer are secured to each other by a reinforcement coating including an organic polymeric material.

29. The hose assembly of claim 28, wherein said organic polymer material is a closed cell fluorocarbon polymer foam.

30. The hose assembly of claim 24, further including at least one metallic braid layer exterior to said reinforcing layer.

31. The hose assembly of claim 30, wherein said metallic braid layer is stainless steel wire.

* * * * *